(12) United States Patent
Kitamura et al.

(10) Patent No.: US 7,679,772 B2
(45) Date of Patent: Mar. 16, 2010

(54) PRINTING APPARATUS AND PRINTING DATA CONTROL METHOD EFFECTING DISTRIBUTED DRIVING OF PRINTING ELEMENTS

(75) Inventors: Hiroki Kitamura, Kanagawa (JP); Hisashi Ishikawa, Chiba (JP); Koji Kawamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1203 days.

(21) Appl. No.: 10/805,324

(22) Filed: Mar. 22, 2004

(65) Prior Publication Data

US 2005/0007607 A1    Jan. 13, 2005

(30) Foreign Application Priority Data

Mar. 24, 2003   (JP)   ............... 2003-081060

(51) Int. Cl.
*G06F 15/00* (2006.01)
*G06K 1/00* (2006.01)
*G06K 15/00* (2006.01)

(52) U.S. Cl. ...................... 358/1.16; 358/1.8
(58) Field of Classification Search .............. 347/5, 347/9, 10, 12, 13, 14, 40, 47, 57, 74, 80; 358/1.8, 1.16
See application file for complete search history.

(56) References Cited

U.S. PATENT DOCUMENTS

| | | | |
|---|---|---|---|
| 5,832,184 A | | 11/1998 | Konno et al. |
| 5,838,888 A | * | 11/1998 | Oda ........................... 358/1.16 |
| 6,009,245 A | * | 12/1999 | Kato et al. .................. 358/1.17 |
| 6,341,843 B1 | * | 1/2002 | Takemura et al. ............. 347/49 |
| 6,364,446 B1 | | 4/2002 | Ishikawa et al. |
| 6,695,425 B2 | * | 2/2004 | Usui et al. ..................... 347/14 |
| 6,705,694 B1 | * | 3/2004 | Barbour et al. ................. 347/9 |
| 7,092,115 B1 | * | 8/2006 | Nakata ...................... 358/1.16 |

FOREIGN PATENT DOCUMENTS

| | | |
|---|---|---|
| EP | 0 978 799 | 2/2000 |
| JP | 2000-43347 | 2/2000 |

OTHER PUBLICATIONS

U.S. Appl. No. 09/363,823, filed Jul. 30, 1999, Kazuhiro Nakata.

* cited by examiner

*Primary Examiner*—Douglas Q Tran
(74) *Attorney, Agent, or Firm*—Fitzpatrick, Cella, Harper & Scinto

(57) ABSTRACT

In a printing apparatus which performs printing by scanning a carriage, which supports a printhead having a plurality of printing elements arrayed in a predetermined direction, relative to a printing medium in a direction perpendicular to the predetermined direction, printing data of a raster format obtained by processing transmitted image information into data used for printing, or printing data transmitted in the raster format is stored in a printing data memory. The printing data stored in the printing data memory is stored in a buffer memory having a storage area corresponding to each printing element. A head parameter unit stores information on the printhead arrangement. Processing of reading out the printing data stored in the printing data memory and storing the printing data in the buffer memory, and processing of reading out the printing data stored in the buffer memory are controlled in accordance with the information stored in the head parameter unit.

7 Claims, 21 Drawing Sheets

FIG. 1

| ADDRESS | DATA |
|---|---|
| 0 | C0-0 |
| 1 | C0-1 |
| 2 | C0-2 |
| 3 | C0-3 |
| 4 | C0-4 |
| ... | ... |
| n-2 | C0-n-2 |
| n-1 | C0-n-1 |
| n | C1-0 |
| n+1 | C1-1 |
| n+2 | C1-2 |
| n+3 | C1-3 |
| n+4 | C1-4 |
| ... | ... |
| n+m-2 | C1-m-2 |
| n+m-1 | C1-m-1 |
| n+m | C2-0 |
| n+m+1 | C2-1 |
| n+m+2 | C2-2 |
| n+m+3 | C2-3 |
| n+m+4 | C2-4 |
| ... | ... |
| n+m+l-2 | C2-l-2 |
| n+m+l-1 | C2-l-1 |
| n+m+l | Blank |
| n+m+l+1 | Blank |
| n+m+l+2 | Blank |
| n+m+l+3 | Blank |
| n+m+l+4 | Blank |
| ... | ... |
| N-2 | Blank |
| N-1 | Blank |

FIG. 8A

```
library IEEE;
use IEEE.std_logic_1164.all;
use IEEE.std_logic_arith.all;
use IEEE.std_logic_unsigned.all;

entity BUFFER CONTROL is
    GENERIC(
        CONSTANT X_MSB  :integer: =13;   --left range of X num-
        CONSTANT B_NUM  :integer: =5;    --data num-1 to Print Cont. per block
        CONSTANT A_MSB  :integer: =24;   --left range of address
        CONSTANT A_LSB  :integer: =2);   --right range of address port(
        rst_n      :IN std_logic;                              --asynchronous reset: Low active
        clk        :IN std_logic;                              --Pixel clock
        c_max      :IN std_logic_vector(1 DOWNTO 0);           --color num
        c0_num     :IN std_logic_vector(8 DOWNTO 0);           --c0 nozzle num-1
        c1_num     :IN std_logic_vector(8 DOWNTO 0);           --c1 nozzle num-1
        c2_num     :IN std_logic_vector(8 DOWNTO 0);           --c2 nozzle num-1
        c3_num     :IN std_logic_vector(8 DOWNTO 0);           --c3 nozzle num-1
        blk_tbl0_0 :IN std_logic_vector(31 DOWNTO 0);          --block sequence table 0L
        blk_tbl0_1 :IN std_logic_vector(31 DOWNTO 0);          --block sequence table 0H
        nl_diff    :IN std_logic_vector(A_MSB DOWNTO A_LSB);   --next line addr diff
        c0_diff    :IN std_logic_vector(A_MSB DOWNTO A_LSB);   --c0->c1 address diff
        c1_diff    :IN std_logic_vector(A_MSB DOWNTO A_LSB);   --c1->c2 address diff
        c2_diff    :IN std_logic_vector(A_MSB DOWNTO A_LSB);   --c2->c3 address diff
        c3_diff    :IN std_logic_vector(A_MSB DOWNTO A_LSB);   --c3->c0 address diff
        bm_strt_adr :IN std_logic_vector(A_MSB DOWNTO A_LSB);  --bitmap start addr
        Bsync      :IN std_logic;                              --block sync pulse
        print_e    :IN std_logic;                              --print enable
        BE         :OUT std_logic_vector(3 DOWNTO 0);          --heat block
        data       :OUT std_logic_vector(B_NUM DOWNTO 0);      --heat data
        init       :IN std_logic;                              --initialize from arbter
        r_na       :IN std_logic;  --Next read cycle Address request of bitmap
        r_valid    :IN std_logic;                              --bitmap data valid
        r_req      :OUT std_logic;                             --bitmap read request
        r_adr      :OUT std_logic_vector(A_MSB DOWNTO A_LSB);  --bitmap address
        dat_0      :IN std_logic_vector(31 DOWNTO 0);          --SRAM0 data
        dat_1      :IN std_logic_vector(31 DOWNTO 0);          --SRAM1 data
        adr_0      :OUT std_logic_vector(8 DOWNTO 0);          --SRAM0 address
        adr_1      :OUT std_logic_vector(8 DOWNTO 0);          --SRAM1 address
        we_0       :OUT std_logic;                             --SRAM0 write enable
        we_1       :OUT std_logic;                             --SRAM1 write enable
    );
end BUFFER CONTROL;
```

FIG. 8B

```
ARCHITECTURE RTL OF BUFFER CONTROL IS
        constant B4_0      :std_logic_vector(3 downto 0)              :=(others=>'0');
        constant B4_1      :std_logic_vector(3 downto 0)              :=(others=>'1');
        constant B5_0      :std_logic_vector(4 downto 0)              :=(others=>'0');
        constant B7_0      :std_logic_vector(6 downto 0)              :=(others=>'0');
        constant B9_0      :std_logic_vector(8 downto 0)              :=(others=>'0');
        constant X_11_0    :std_logic_vector(X_MSB downto 11)         :=(others=>'0');
        constant X_12_0    :std_logic_vector(X_MSB downto 12)         :=(others=>'0');
        signal ini         :std_logic;                         --counter initialize
        signal x_count     :std_logic_vector(X_MSB downto 0);
        signal Bsync_1     :std_logic;                         --block sync. delay 1
        signal Bsync_2     :std_logic;                         --block sync. delay 2
        signal Bsync_3     :std_logic;                         --block sync. delay 3
        signal Bsync_p     :std_logic;                         --block sync. rising edge
        signal b_count     :std_logic_vector(3 downto 0);      --block sync. count
        signal column_end  :std_logic;
        signal prt_ena_1   :std_logic;                         --print enable delay 1
        signal prt_ena_2   :std_logic;                         --print enable delay 2
        signal prt_ena_3   :std_logic;                         --print enable delay 3
        signal Hsync_p     :std_logic;                         --print enable rising edge
        signal color_end   :std_logic;                         --nozzle boundary of color
        signal color_base  :std_logic_vector(8 downto 0);      --color boundary
        signal buf_valid   :std_logic;                         --buffer is valid
        signal buf_valid_1 :std_logic;                         --buffer address is valid
        signal buf_valid_2 :std_logic;                         --buffer output is valid
        signal n_count     :std_logic_vector(4 downto 0);      --nozzle num in block
        signal color       :std_logic_vector(1 downto 0);      --color num -1
        signal color_1     :std_logic_vector(1 downto 0);      --color for SRAM out :delay 1
        signal n_num_div16 :std_logic_vector(8 downto 4);      --c_num/16
        signal block_end   :std_logic;
        signal c_num       :std_logic_vector(8 downto 0);      --color nozzle num-1
        signal b_r_adr     :std_logic_vector(8 downto 0);      --buffer read address
        signal r_adr_tmp   :std_logic_vector(A_MSB downto A_LSB); --EXT RAM address
        signal r_color     :std_logic_vector(1 downto 0);      --color for EXT RAM read
        signal bf_chg      :std_logic;                         --read buffer change
        signal r_count     :std_logic_vector(8 downto 0);      --EXT RAM read counter
        signal r_c_count   :std_logic_vector(8 downto 0);      --EXT RAM color num counter
        signal r_c_end     :std_logic;                         --EXT RAM color end
        signal r_c_num     :std_logic_vector(8 downto 0);      --color num-1 for EXT RAM
        signal r_v_count   :std_logic_vector(8 downto 0);      --EXT RAM read valid counter
        signal r_req_tmp   :std_logic;                         --bitmap read request
        signal r_req_stack :std_logic_vector(2 downto 0);      --EXT RAM read req stack
        signal r_ini_end   :std_logic;                         --1st buffer fill req end
        signal w_ini_end   :std_logic;                         --1st buffer fill write end
        signal r_end       :std_logic;                         --EXT RAM read end
        signal w_end       :std_logic;                         --buffer write end
        signal data        :std_logic_vector(B_NUM downto 0);  --heat data
        signal bn          :std_logic_vector(3 downto 0);      --nozzle block number
        signal x_pst       :std_logic_vector(X_MSB downto 0);  --x position for heat data
        signal bf0_rd      :std_logic_vector(3 downto 0);      --buffer_0 read for odd nozzle
        signal bf0_rd_all  :std_logic;                         --all nozzle read buffer_0
        signal bf1_rd_all  :std_logic;                         --all nozzle read buffer_1
        signal bf0_read    :std_logic;                         --buffer_0 read
        signal bf0_read_1  :std_logic;                         --buffer_0 read delay 1
        signal h_dat       :std_logic;                         --heat data
        signal tb_sel      :std_logic_vector(1 downto 0);      --block seq. table select
        signal bn_seq      :std_logic_vector(63 downto 0);     --block sequence
        signal x_diff      :std_logic_vector(A_MSB downto A_LSB);
        signal h_dat_s     :std_logic;                         --heat data from SRAM
        signal bf0_wite    :std_logic;                         --buffer_0 write
        signal c_max_tmp   :std_logic_vector(1 downto 0);      --color num for yobito
        signal buf_v_ini   :std_logic;                         --for buffer initial read
        signal buf_vld_1   :std_logic;                         --buffer address is valid
        signal pst_1       :std_logic_vector(4 downto 0);      --x pos for read address
```

FIG. 8C

```
BEGIN
        ini <= NOT(print_e) OR init ;
        buf_vld_1 <= buf_valid AND buf_valid_1 ;

Bsync_dly : PROCESS (clk, rst_n)
    BEGIN
        IF (rst_n='0') THEN
                    Bsync_1 <='0' ;
                    Bsync_2 <='0' ;
                    Bsync_3 <='0' ;
                    prt_ena_1 <='0' ;
                    prt_ena_2 <='0' ;
                    prt_ena_3 <='0' ;
        ELSIF clk ='1' AND clk'event THEN
            IF ini='1' OR ena='0' THEN
                    Bsync_1 <='0' ;
                    Bsync_2 <='0' ;
                    Bsync_3 <='0' ;
                    prt_ena_1 <='0' ;
                    prt_ena_2 <='0' ;
                    prt_ena_3 <='0' ;
            ELSE
                    Bsync_1 <=Bsync ;
                    Bsync_2 <=Bsync_1 ;
                    Bsync_3 <=Bsync_2 ;
                    prt_ena_1 <=print_e ;
                    prt_ena_2 <=prt_ena_1 ;
                    prt_ena_3 <=prt_ena_2 ;
            END IF ;
        END IF;
    END PROCESS Bsync_dly ;

Bsync_pulse : PROCESS (Bsync_2, Bsync_3)
    BEGIN
        IF Bsync_2='1' AND Bsync_3='0' THEN
                    Bsync_p<='1' ;
        ELSE
                    Bsync_p<='0' ;
        END IF ;
    END PROCESS Bsync_pulse ;

Hsync_pulse : PROCESS (prt_ena_2, prt_ena_3)
    BEGIN
        IF prt_ena_2='1' AND prt_ena_3='0' THEN
                    Hsync_p<='1' ;
        ELSE
                    Hsync_p<='0' ;
        END IF ;
    END PROCESS Hsync_pulse ;

--for buffer read
    clr_bas_gen : PROCESS (clk, rst_n)
    BEGIN
        IF (rst_n='0') THEN
                    color_base<=(others =>'0') ;
        ELSIF clk='1' AND clk'event THEN
            IF init='1' OR block_end='1' THEN
                    color_base<=(others =>'0') ;
            ELSIF color_end='1' THEN
                    color_base<=color_base+c_num+'1' ;
            END IF ;
        END IF ;
    END PROCESS clr_bas_gen ;
```

```
num_cnt : PROCESS(clk, rst_n)--color access counter of each block
BEGIN
    IF (rst_n ='0') THEN
                n_count<=(others =>'0');
        ELSIF clk='1' AND clk'event THEN
                IF buf_vld_1='0' OR color_end='1' THEN
                            n_count<=(others =>'0');
                ELSE
                            n_count<=n_count+'1';
                END IF;
    END IF;
END PROCESS num_cnt;

end_ncnt_det : PROCESS (n_count, n_num_div16, buf_vid_1)
BEGIN
    IF n_count=n_num_div16 THEN
                color_end<=buf_vid_1;
    ELSE
                color_end<='0';
    END IF;
END PROCESS end_ncnt_det;

color_cnt : PROCESS (clk, rst_n)
BEGIN
    IF (rst_n ='0') THEN
                color<=(others =>'0');
        ELSIF clk='1' AND clk'event THEN
                IF init='1' OR block_end='1' THEN
                            color<=(others =>'0');
                ELSIF color_end='1' THEN
                            color<=color+'1';
                END IF;
    END IF;
END PROCESS color_cnt;

end_blk_det : PROCESS (color, c_max_tmp, color_end)
BEGIN
    IF color=c_max_tmp THEN
                block_end<=color_end;
    ELSE
                block_end<='0';
    END IF;
END PROCESS end_blk_det;

div16_mux : PROCESS (color, c0_num, c1_num, c2_num, c3_num, c_num)
BEGIN
        CASE color IS
                    WHEN "00"       =>      c_num<=c0_num;
                    WHEN "01"       =>      c_num<=c1_num;
                    WHEN "10"       =>      c_num<=c2_num;
                    WHEN others     =>      c_num<=c3_num;
        END CASE;
        n_num_div16<=c_num(8 DOWNTO 4);
END PROCESS div16_mux;

buf_vld_gen : PROCESS (clk, rst_n)
BEGIN
    IF (rst_n ='0')THEN
                buf_valid<='0';
        ELSIF clk='1' AND clk'event THEN
                IF init='1' OR block_end='1' THEN
                            buf_valid<='0';
                ELSIF Bsync_p='1' THEN
                            buf_valid<='1';
                ELSE
                        IF w_ini_end='0' AND w_end='1' THEN
                                    buf_valid<='1';
                        END IF;
                END IF;
    END IF;
END PROCESS buf_vld_gen;
```

FIG. 8E

```
b_cnt : PROCESS (rst_n, clk)
        BEGIN
            IF rst_n='0' THEN
                b_count<=(others =>'0') ;
            ELSIF clk='1' AND clk'event THEN
                        IF ini='1' OR Hsync_p='1' OR column_end='1' THEN
                            b_count<=(others =>'0') ;
                        ELSIF Bsync_p='1' THEN
                            b_count<=b_count+'1' ;          --count up
                        END' IF ;
            END IF ;
        END PROCESS b_cnt;

end_Block_det : PROCESS (dir, bs_auto, b_count, Bsync_p)
        BEGIN
            IF dir='0' OR bs_auto='0' THEN
                IF b_count=B4_1 THEN
                    column_end<=Bsync_p ;
                ELSE
                    column_end<='0' ;
                END IF ;
            ELSE
                IF b_count=B4_0 THEN
                    column_end<=Bsync_p ;
                ELSE
                    column_end<='0' ;
                END IF ;
            END IF ;
        END PROCESS end_Block_det ;

x_cnt : PROCESS (rst_n, clk)
        BEGIN
            IF rst_n='0' THEN
                x_count<=(others =>'0') ;
            ELSIF clk='1' AND clk'event THEN
                        IF ini='1' OR Hsync_p='1' THEN
                            x_count<=(others =>'0') ;
                        ELSIF column_end='1' THEN
                            x_count<=x_count+'1' ;
                        END IF ;
            END IF ;
        END PROCESS x_cnt ;

x_pst<=x_count+x_off ;

b_r_adr_gen : PROCESS (n_count, color_base, bn, x_pst)
        variable  b_r_adr_tmp               : std_logic_vector(8 downto 0) ;
        BEGIN
            b_r_adr_tmp :=color_base+(n_count(4 downto 1)& bn & n_count(0)) ;
            b_r_adr <=b_r_adr_tmp(7 downto 0)& x_pst(5) ;
        END PROCESS b_r_adr_gen ;
```

FIG. 8F

```
bf_vld_dly : PROCESS (clk, rst_n)
BEGIN
    IF (rst_n='0') THEN
                buf_valid_1<='0' ;
                buf_valid_2<='0' ;
    ELSIF clk='1' AND clk'event THEN
            IF init='1' THEN
                buf_valid_1<='0' ;
                            buf_valid_2<='0' ;
            ELSE
                            buf_valid_1<=buf_valid ;
                            buf_valid_2<=buf_vld_1 ;
        END IF ;
    END IF ;
END PROCESS bf_vld_dly ;

color_dly : PROCESS (clk, rst_n)
BEGIN
    IF (rst_n='0') THEN
                color_1<=(others=>'0') ;
    ELSIF clk='1' AND clk'event THEN
                color_1<=color ;
    END IF ;
END PROCESS color_dly ;

bf0_read<=NOT x_pst(5) ;

bf0_read_dly : PROCESS (rst_n, clk)
BEGIN
        IF rst_n='0' THEN
                bf0_read_1<='0' ;
    ELSIF clk='1' AND clk'event THEN
                bf0_read_1<=bf0_read ;
        END IF ;
END PROCESS bf0_read_dly ;

bn_seq<=blk_tbl0_0 & blk_tbl0_1 ;
bn_dly : PROCESS (rst_n, clk)
variable    bn_sel           : std_logic_vector(3 downto 0) ;
variable    lsb              : integer range 0 to 63 ;
BEGIN
        IF rst_n='0' THEN
                bn<=(others=>'0') ;
    ELSIF clk='1' AND clk'event THEN
                IF buf_valid='1' AND buf_valid_1='0' THEN
                    bn_sel : =NOT (b_count) ;
                        lsb : =CONV_INTEGER ('0' & bn_sel & "00") ;
                            FOR i IN 0 TO 3 LOOP
                                    bn(i)<=bn_seq(i+lsb) ;
                            END LOOP ;
                END IF ;
        END IF ;
END PROCESS bn_dly ;
```

F I G. 8G

```
bf0_rd_d : PROCESS (rst_n, clk)
BEGIN
        IF rst_n='0' THEN
                        bf0_rd<= (others =>'0') ;
    ELSIF clk='1' AND clk'event THEN
                IF init='1' THEN
                        bf0_rd<= (others =>'0') ;
                ELSIF buf_vld_1='1' THEN
                                bf0_rd (CONV_INTEGER(color))<=bf0_read ;
                END IF ;
        END IF ;
END PROCESS bf0_rd_d ;

bf_rd_all_det : PROCESS (c_max_tmp, e_bf0_rd, o_bf0_rd)
BEGIN
        bf0_rd_all<='0' ;
        bf1_rd_all<='0' ;
        CASE c_max_tmp IS
                WHEN "00"        =>
                        IF bf0_rd (0)='1' THEN
                                bf0_rd_all<='1' ;
                        END IF ;
                        IF bf0_rd (0)='0' THEN
                                bf1_rd_all<='1' ;
                        END IF ;
                WHEN "01"        =>
                        IF bf0_rd (1 DOWNTO 0)="11" THEN
                                bf0_rd_all<='1' ;
                        END IF ;
                        IF bf0_rd (1 DOWNTO 0)="00" THEN
                                bf1_rd_all<='1' ;
                        END IF ;
                WHEN "10"        =>
                        IF bf0_rd (2 DOWNTO 0)="111" THEN
                                bf0_rd_all<='1' ;
                        END IF ;
                        IF bf0_rd (2 DOWNTO 0)="000" THEN
                                bf1_rd_all<='1' ;
                        END IF ;
                WHEN others      =>
                        IF bf0_rd (3 DOWNTO 0)="1111" THEN
                                bf0_rd_all<='1' ;
                        END IF ;
                        IF bf0_rd (3 DOWNTO 0)="0000" THEN
                                bf1_rd_all<='1' ;
                        END IF ;
        END CASE ;
END PROCESS bf_rd_all_det ;

bf_write_det : PROCESS (rst_n, clk)
BEGIN
        IF rst_n='0' THEN
                bf0_wite<='1' ;
    ELSIF clk='1' AND clk'event THEN
                IF init='1' THEN
                        bf0_wite<='1' ;
                ELSIF bf_chg_1='1' THEN
                        bf0_wite<=NOT bf0_wite ;
                END IF ;
        END IF ;
END PROCESS bf_write_det ;

bf_chg_gen : PROCESS (Hsync_p, w_ini_end, w_end, bf0_wite, bf0_rd_all, bf1_rd_all)
variable    ini_chg          : std_logic ;
BEGIN
                ini_chg := (NOT w_ini_end AND w_end) ;
        IF bf0_wite='1' THEN
                bf_chg<=ini_chg OR (w_end AND bf0_rd_all) ;
        ELSE
                bf_chg<=ini_chg OR (w_end AND bf1_rd_all) ;
        END IF ;
END PROCESS bf_chg_gen ;
```

FIG. 8H

```
pst_dly : PROCESS (clk, rst_n)
BEGIN
    IF (rst_n='0') THEN
                pst_1<=(others =>'1') ;
    ELSIF clk='1' AND clk'event THEN
                pst_1<=NOT x_pst(4 downto 0) ;
    END IF ;
END PROCESS pst_dly ;

h_dat_s_mux : PROCESS (pst_1, bf0_read_1, dat_0, dat_1)
variable    pst                         : integer range 0 to 31 ;
BEGIN
        pst :=CONV_INTEGER ('0' & pst_1) ;

IF bf0_read_1='1' THEN
                h_dat_s<=dat_0(pst) ;
        ELSE
                h_dat_s<=dat_1(pst) ;
    END IF ;
END PROCESS h_dat_s_mux ;

h_dat<=h_dat_s;

out_pack : PROCESS (clk, rst_n)
BEGIN
    IF (rst_n='0') THEN
                data<=(others =>'0') ;
    ELSIF clk='1' AND clk'event THEN
                IF buf_valid_2='1' AND(print_e='1' OR buf_v_ini='1') THEN
                        data(0)<=h_dat ;
                        FOR i IN TO B_NUM LOOP
                            data(i)<=data(i-1) ;
                        END LOOP ;
            END IF ;
    END IF ;
END PROCESS out_pack ;
```

FIG. 8I

```
r_v_cnt : PROCESS (clk, rst_n)
BEGIN
    IF (rst_n='0') THEN
            r_v_count<=(others =>'0');           --buffer write address
    ELSIF clk='1' AND clk'event THEN
            IF init='1' OR bf_chg='1' THEN
                    r_v_count<=(others =>'0');
            ELSIF r_valid='1' THEN
                    r_v_count<=r_v_count+'1';
            END IF;
    END IF;
END PROCESS r_v_cnt;

end_w_ini : PROCESS (clk, rst_n)
BEGIN
    IF (rst_n='0') THEN
            w_ini_end<='0';
    ELSIF clk='1' AND clk'event THEN
            IF init='1' THEN
                    w_ini_end<='0';
            ELSIF w_end='1' THEN
                    w_ini_end<='1';
            END IF;
    END IF;
END PROCESS end_w_ini;

w_end_det : PROCESS (r_req_tmp, r_req_stack)
BEGIN
        IF r_req_tmp='0' AND r_req_stack="000" THEN
                w_end<='1';
        ELSE
                w_end<='0';
        END IF;
END PROCESS w_end_det;

bf_adr_mux : PROCESS (r_valid, bf0_wite, print_e, yp_yobi, b_r_adr, r_v_count)
BEGIN
        IF r_valid='1' THEN
                IF bf0_wite='0' THEN
                        adr_0<=b_r_adr;
                        adr_1<=r_v_count;
                        we_0<='0';
                        we_1<='1';
                ELSE
                        adr_0<=r_v_count
                        adr_1<=b_r_adr;
                        we_0<='1';
                        we_1<='0';
                END IF;
        ELSE
                we_0<='0';
                we_1<='0';
                adr_0<=b_r_adr;
                adr_1<=b_r_adr;
        END IF;
END PROCESS bf_adr_mux;

bf_v_ini_det : PROCESS (clk, rst_n)
BEGIN
    IF (rst_n='0') THEN
            buf_v_ini<='0'
    ELSIF clk='1' AND clk'event THEN
            IF init='1' OR block_end='1' THEN
                    buf_v_ini<='0';
            ELSE
                    IF w_ini_end='0' AND w_end='1' THEN
                            buf_v_ini<='1';
                    END IF;
            END IF;
    END IF;
END PROCESS bf_v_ini_det;
```

FIG. 8J

```
cmax_det : PROCESS (c_max)
BEGIN
        IF c_max="11" THEN
                c_max_tmp<="11";
        ELSE
                c_max_tmp<=c_max;
        END IF;
END PROCESS cmax_det;

r_req_gen : PROCESS (clk, rst_n)
BEGIN
    IF (rst_n='0') THEN
            r_req_tmp<='0';
    ELSIF clk='1' AND clk'event THEN
            IF init='1' OR bf_chg='1' THEN
                    r_req_tmp<='1';
            ELSIF r_end='1' THEN
                    r_req_tmp<='0';
            END IF;
    END IF;
END PROCESS r_req_gen;

r_req_stck : PROCESS (clk, rst_n)
BEGIN
    IF (rst_n='0') THEN
            r_req_stack<=(others =>'1');
    ELSIF clk='1' AND clk'event THEN
            IF init='1' THEN
                    r_req_stack<=(others =>'0');
            ELSIF r_na='1' THEN
                    IF r_valid='0' THEN
                            r_req_stack(2 downto 1)<=r_req_stack(2 downto 1)+'1';
                    ELSE
                            r_req_stack<=r_req_stack+'1';
                    END IF;
            ELSIF r_valid='1' THEN
                    r_req_stack<=r_req_stack-'1';
            END IF;
    END IF;
END PROCESS r_req_stck;

end_r_ini : PROCESS (clk, rst_n)
BEGIN
    IF (rst_n='0') THEN
            r_ini_end<='0';
    ELSIF clk='1' AND clk'event THEN
            IF init='1' THEN
                    r_ini_end<='0';
            ELSIF r_end='1' THEN
                    r_ini_end<='1';
            END IF;
    END IF;
END PROCESS end_r_ini;

r_end_det : PROCESS (r_color, c_max_tmp, r_c_end)
BEGIN
        IF r_color=c_max_tmp AND r_c_end='1' THEN
                r_end<='1';
        ELSE
                r_end<='0';
        END IF;
END PROCESS r_end_det;

r_adr<=r_adr_tmp;
r_req<=r_req_tmp;
BE<=o_bn;
```

FIG. 8K

```vhdl
--for EXT RAM read
        r_ad_gen : PROCESS (clk, rst_n)
        BEGIN
            IF (rst_n='0') THEN
                        r_adr_tmp<=(others =>'0');
            ELSIF clk='1' AND clk'event THEN
                        IF init='1' THEN
                                r_adr_tmp<=bm_strt_adr;
                        ELSIF r_na='1' THEN
                                IF r_c_end='1' THEN
                                    r_adr_tmp<=r_adr_tmp+x_diff;
                                ELSE
                                    r_adr_tmp<=r_adr_tmp+n1_diff;
                                END IF;
                        END IF;
            END IF;
        END PROCESS r_ad_gen;

dif_sel : PROCESS (r_color, c0_diff, c1_diff, c2_diff. c3_diff, c0_num, c1_num, c2_num, c3_num)
        BEGIN
                CASE r_color IS
                    WHEN "00"      =>      x_diff<=c0_diff;        r_c_num<=c0_num;
                    WHEN "01"      =>      x_diff<=c1_diff;        r_c_num<=c1_num;
                    WHEN "10"      =>      x_diff<=c2_diff;        r_c_num<=c2_num;
                    WHEN others    =>      x_diff<=c3_diff;        r_c_num<=c3_num;
                END CASE
        END PROCESS dif_sel;

c_cnt : PROCESS (clk, rst_n)   --EXT RAM read counter for color
        BEGIN
            IF (rst_n='0') THEN
                        r_c_count<=(others =>'0');
            ELSIF clk='1' AND clk'event THEN
                        IF init='1' THEN
                                r_c_count<=(others =>'0');
                        ELSIF r_c_end='1' THEN
                                r_c_count<=(others =>'0');
                        ELSIF r_na='1' THEN
                                r_c_count<=r_c_count+'1';
                        END IF;
            END IF
        END PROCESS c_cnt;

r_col_cnt : PROCESS (clk, rst_n)
        BEGIN
            IF (rst_n='0') THEN
                        r_color<=(others =>'0');
            ELSIF clk='1' AND clk'event THEN
                        IF init='1' OR bf_chg='1' THEN
                                r_color<=(others =>'0');
                        ELSIF r_c_end='1' THEN
                                r_color<=r_color+'1';
                        END IF;
            END IF;
        END PROCESS r_col_cnt;

end_col_det : PROCESS (r_c_count, r_c_num, r_na)
        BEGIN
            IF r_count=r_c_num THEN
                        r_c_end<=r_na;
            ELSE
                        r_c_end<='0';
            END IF;
        END PROCESS end_col_det;

END RTL;
```

FIG. 9

| Parameter Name | Parameter Address | Parameter Value |
|---|---|---|
| c_num | 0(Hex) | 2 |
| c0_n_num | 4(Hex) | n |
| c1_n_num | 8(Hex) | m |
| c2_n_num | C(Hex) | l |
| c0_diff | 10(Hex) | 1 |
| c1_diff | 14(Hex) | 1 |
| c2_diff | 18(Hex) | FFFFFFC1 |
| bm_strt_adr | 1C(Hex) | 100 |
| nl_diff | 20(Hex) | 40 |

PRINTING APPARATUS AND PRINTING DATA CONTROL METHOD EFFECTING DISTRIBUTED DRIVING OF PRINTING ELEMENTS

FIELD OF THE INVENTION

The present invention relates to a printing apparatus and printing data control method and, more particularly, to a technique of processing printing data in a printing apparatus which performs printing by scanning a carriage that supports a printhead having a plurality of printing elements arrayed in a predetermined direction, on a printing medium in a direction perpendicular to the printing element array direction.

BACKGROUND OF THE INVENTION

A printer which performs printing information such as a desired character or image on a sheet-like printing medium such as a paper sheet or film is widely used as an information output apparatus in a wordprocessor, personal computer, facsimile apparatus, and the like.

Various methods are known as printing methods in the printer. Especially an ink-jet method has recently received a great deal of attention because this method can realize non-contact printing on a printing medium such as a paper sheet, easily prints in color, and is quiet. Because of low cost and easy downsizing, a popular ink-jet arrangement is a serial printing system in which a printhead for discharging ink in accordance with desired printing information is mounted and prints while the printhead is reciprocally scanned in a direction perpendicular to the convey direction of a printing medium such as a paper sheet.

In order to widen a region printed by one scanning and increase the printing speed, the printhead of the ink-jet printer has many printing elements (nozzles) arrayed in almost the same direction as the printing medium convey direction. The ink-jet printer generally comprises a plurality of printing element arrays or printheads in correspondence with a plurality of inks for use for color printing and/or multitone printing.

In general, image data from a host device such as a personal computer is transmitted as raster data of one line that is rasterized in the scanning direction (horizontal direction). The printer which has received the raster data performs H-V conversion of rearranging image data in accordance with the printing element array direction (vertical direction).

In order to stably discharge ink at high speed from an ink-jet printer, the ink-jet printer adopts distributed discharge control of controlling to simultaneously discharge ink from a plurality of nozzles arrayed at specific intervals, instead of simultaneously discharging ink from all nozzles.

When the ink-jet printer using distributed discharge control prints by color printing or the like using a plurality of inks, data management and distributed discharge driving control are executed for each ink used.

For example, in a color printer using three color inks of yellow, magenta, and cyan which are three primary colors in subtractive color mixing, the control circuit is constituted in accordance with the arrangement (the number of nozzles, the positional relationship of the printheads, and the like) of the printhead for each color. When printheads have different arrangements, the control circuit is changed in accordance with each arrangement.

In recent years, ink-jet printers are increasingly used for various purposes, and demands have arisen for higher printing speed and higher image quality. In this situation, the printhead arrangement varies in accordance with the application and purpose.

To facilitate the development and realize low cost, it is desirable to design a control circuit capable of coping with various printhead arrangements.

More specifically, the control circuit is so designed as to arrange a buffer memory for each printhead and generate data to be transferred to the head. Due to various printhead arrangements, the control circuit takes a different circuit arrangement for the arrangement of each printhead for use, and cannot be utilized in a printhead having another arrangement.

For example, in the simplest arrangement in which a buffer memory for storing data to be printed by one scanning is arranged for each printhead (ink), the capacity of the buffer memory changes in accordance with the printing medium size and resolution used for printing. When the buffer memory is formed in a very large scale integrated circuit (VLSI) for higher processing speed, the buffer memory occupies most of the region on the VLSI. If the buffer memory is downsized, but a plurality of types of buffer memories are formed in correspondence with printheads with a plurality of arrangements, the physical region occupied by the memories inefficiently increases.

Some control circuits are so configured as to simultaneously access data at a plurality of addresses in order to efficiently access the memory in accordance with the printhead specifications. Such circuit comprises, e.g., a register and counter for setting the start address, as shown in FIG. 11. By using the counter, data in number set at the counter can be accessed from a desired address.

However, this circuit arrangement limits the specifications of a compatible printhead. Depending on the contents of a specification change, the control circuit must be changed.

As described above, it is difficult for printheads with various arrangements to commonly employ a control circuit for the printhead and a large-scale logical circuit including the control circuit. The control circuit of the printhead inhibits efficient development and low-cost apparatuses.

SUMMARY OF THE INVENTION

The present invention can allow printheads with various arrangements to use a common control circuit in a serial printing type printing apparatus.

According to one aspect of the present invention there is provided a printing apparatus which performs printing by scanning a carriage that supports a printhead having a plurality of printing elements arrayed in a predetermined direction, on a printing medium in a direction perpendicular to the predetermined direction, comprising: a printing data memory which stores printing data of a raster format; a buffer memory which has a storage area corresponding to each printing element and stores printing data stored in the printing data memory; a head parameter unit which stores information on an arrangement of the printhead; and a buffer controller which controls, in accordance with the information stored in the head parameter unit, processing of reading out the printing data stored in the printing data memory and storing the printing data in the buffer memory, and processing of reading out the printing data stored in the buffer memory.

According to the present invention, in a printing apparatus which performs printing by scanning a carriage that supports a printhead having a plurality of printing elements arrayed in a predetermined direction, on a printing medium in a direction perpendicular to the predetermined direction, printing data of a raster format obtained by processing transmitted image information into data used for printing, or printing data transmitted in the raster format is stored in a printing data memory. The printing data stored in the printing data memory is stored in a buffer memory having a storage area corresponding to each printing element. This arrangement adopts a head parameter unit which stores information on the printhead arrangement. Processing of reading out the printing data stored in the printing data memory and storing the printing data in the buffer memory, and processing of reading out the printing data stored in the buffer memory are controlled in accordance with the information stored in the head parameter unit.

This arrangement enables using a common control circuit for printheads having various arrangements. The use of a common control circuit can reduce the cost and shorten the apparatus design period.

The information stored in the head parameter unit may include at least the number of nozzle arrays of the printhead, the number of nozzles which constitute the nozzle arrays, and nozzles to be driven in the nozzle arrays.

The buffer controller may convert the raster data into column data in reading out the printing data stored in the buffer memory.

The buffer controller may read out the printing data stored in the buffer memory from each address.

In this case, the printhead may perform distributed driving for a predetermined number of nozzles, and the buffer controller calculates a read address in accordance with a distributed driving number in reading out the printing data stored in the buffer memory.

Further, the buffer controller may include a register which holds, by a plurality of addresses, data of predetermined bits read out by accessing each address of the buffer memory.

According another aspect of the present invention, there is provided a printing apparatus which performs printing by scanning a printhead having a plurality of printing elements arrayed in a predetermined direction, on a printing medium in a direction perpendicular to the predetermined direction, comprising: a printing data memory which stores printing data of a raster format; a plurality of buffer memories which store raster data of predetermined bits in correspondence with the respective printing elements; a head parameter unit which holds information on the printhead; acquisition means for acquiring address information subjected to read in the printing data memory on the basis of the information on the printhead in storing the printing data read out from the printing data memory in the buffer memory; a buffer controller which stores the printing data read out from the printing data memory in the buffer memory, on the basis of the address information of the printing data memory that is acquired by the acquisition means; and transfer means for transferring the data read out from the buffer memory to the printhead.

In addition to the above aspects of the printing apparatus, the present invention can also be realized by the aspect of a printing data control method in the printing apparatus, the aspect of a computer program which realizes the printing data control method, and the aspect of a storage medium which stores the computer program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view showing an arrangement example of a buffer memory according to an embodiment of the present invention;

FIGS. 8A to 8K are views showing a description example in a hardware description language;

FIG. 9 is a table showing an example of information stored in a head parameter unit;

DETAILED DESCRIPTION OF THE PREFERRED EMBODIMENTS

Preferred embodiments of the present invention will now be described in detail in accordance with the accompanying drawings.

In the following embodiments, a printing apparatus utilizing an inkjet printing system is explained as an example.

In this specification, "print" means not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media.

"Print media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

Figure 7:
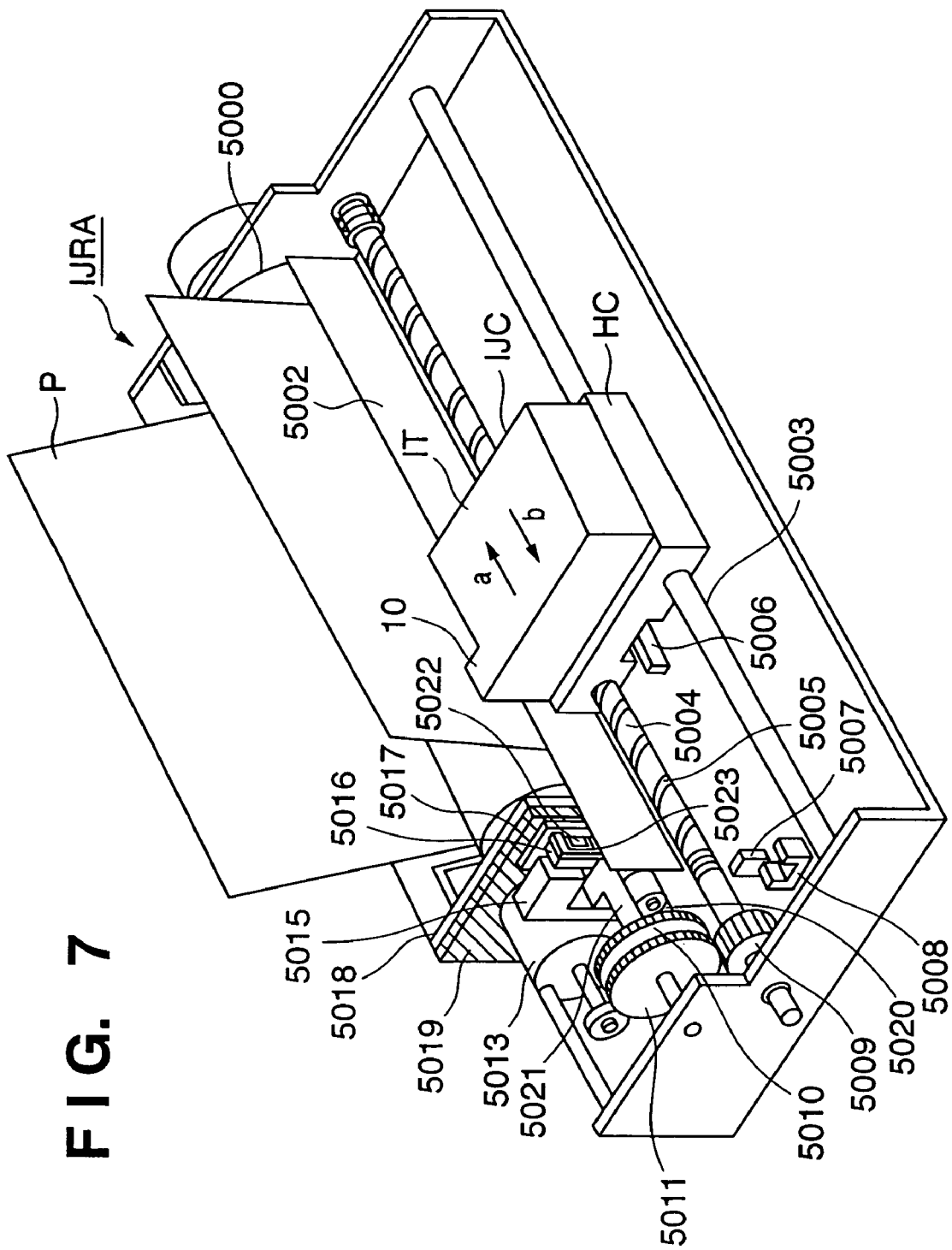
FIG. 7 is a perspective view showing the schematic outer appearance of an ink-jet printer as a preferable embodiment of the present invention.

FIG. 7 is a perspective view showing the schematic outer appearance of an ink-jet printer IJRA as a typical embodiment of the present invention. In FIG. 7, a pin (not shown) is attached to a carriage HC which engages with a helical groove 5005 of a lead screw 5004 that rotates via driving force transfer gears 5009 to 5011 while interlocking with forward/reverse rotation of a driving motor 5013. The carriage HC is supported by a guide rail 5003 and reciprocates in directions indicated by arrows a and b. The carriage HC supports an integral ink-jet cartridge UC which incorporates a printhead 10 and ink tank IT.

Reference numeral 5002 denotes a sheet press plate which presses a printing sheet P against a platen 5000 in the moving direction of the carriage HC. Reference numerals 5007 and 5008 denote photocouplers serving as home position detectors for detecting the presence of a carriage-lever 5006 in a corresponding region and switching the rotational direction of the motor 5013.

Reference numeral 5016 denotes a member which supports a cap member 5022 that caps the front surface of the printhead 10; and 5015, a suction unit which sucks the interior of the cap and performs suction recovery of the printhead via an intra-cap opening 5023. Reference numeral 5017 denotes a cleaning blade; and 5019, a member capable of moving this blade back and forth. The cleaning blade 5017 and member 5019 are supported by a main body support plate 5018. The blade is not limited to this embodiment, and a known cleaning blade can be applied to the embodiment.

Reference numeral 5021 denotes a lever which starts suction recovery operation, and moves together with movement of a cam 5020 engaged with the carriage. A driving force from the driving motor is controlled by a known transfer mechanism such as a clutch switch.

Capping, cleaning, and suction recovery are executed by desired processes at corresponding positions by the operation of the lead screw 5005 when the carriage comes to the home-position region. This embodiment can adopt any setting as long as desired operations are done at known timings.

Figure 2:
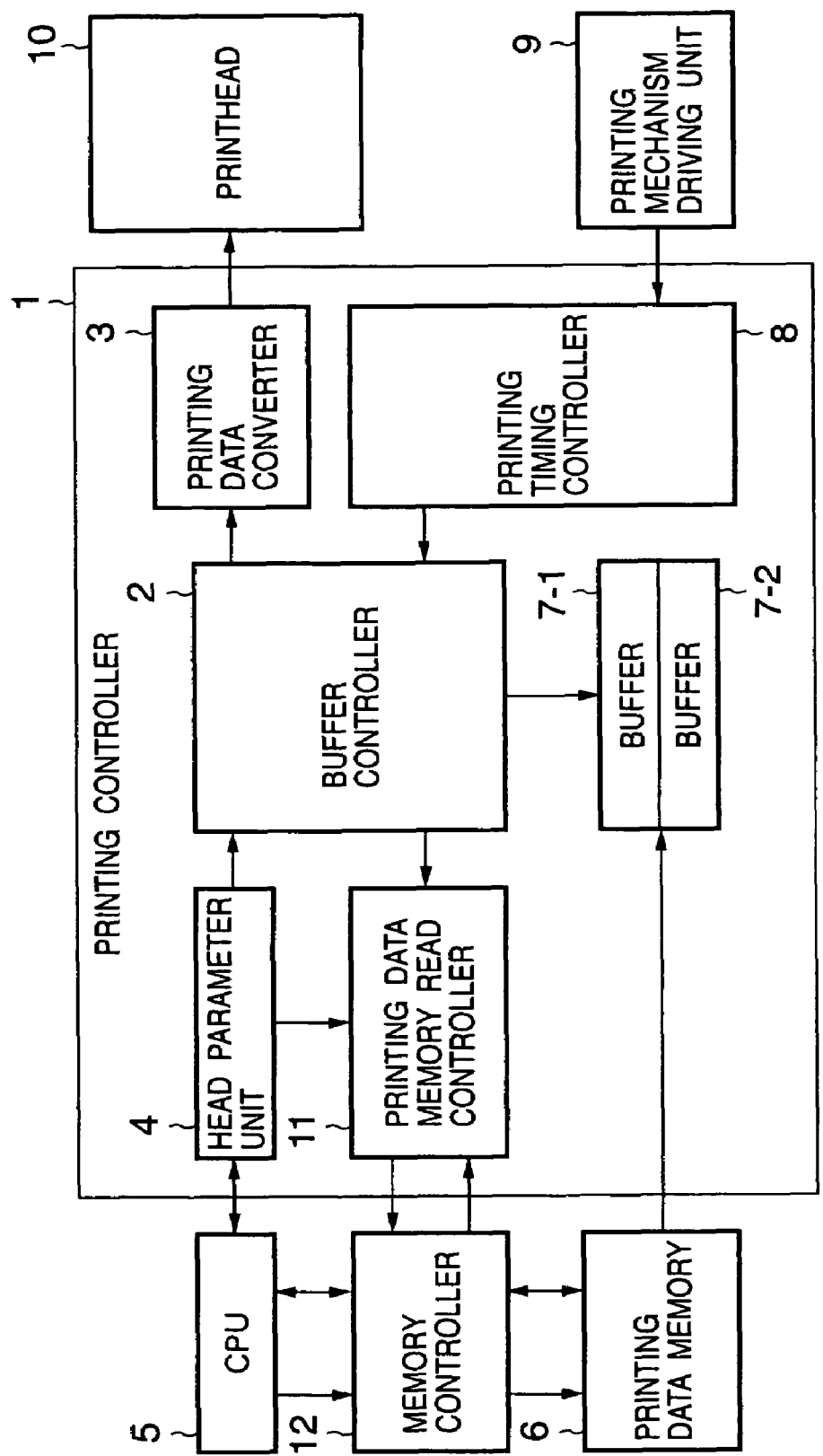
FIG. 2 is a block diagram showing a control arrangement according to the embodiment of the present invention.

FIG. 2 is a block diagram showing a control arrangement for printing by the ink-jet printer according to the embodiment.

As shown in FIG. 2, the control block for printing by the printer according to the embodiment includes a printing controller 1 which controls printing, a CPU 5 which controls the whole apparatus, a printing data memory 6 which stores printing data, a memory controller 12 which controls access to the printing data memory 6, the printhead 10 which maintains and recovers the discharge performance for ink and prints, and a printing mechanism driving unit 9 including a carriage driving mechanism supporting the printhead and a printing medium convey mechanism.

The printing controller 1 includes a buffer memory 7, a buffer controller 2 which controls access to the buffer memory, a printing data converter 3 complying with the transfer method (interface) to the printhead, a head parameter unit 4 which stores information on the printhead arrangement, and a printing timing controller 8 which controls the timing signal on the basis of information from the printing mechanism driving unit.

Figure 12:
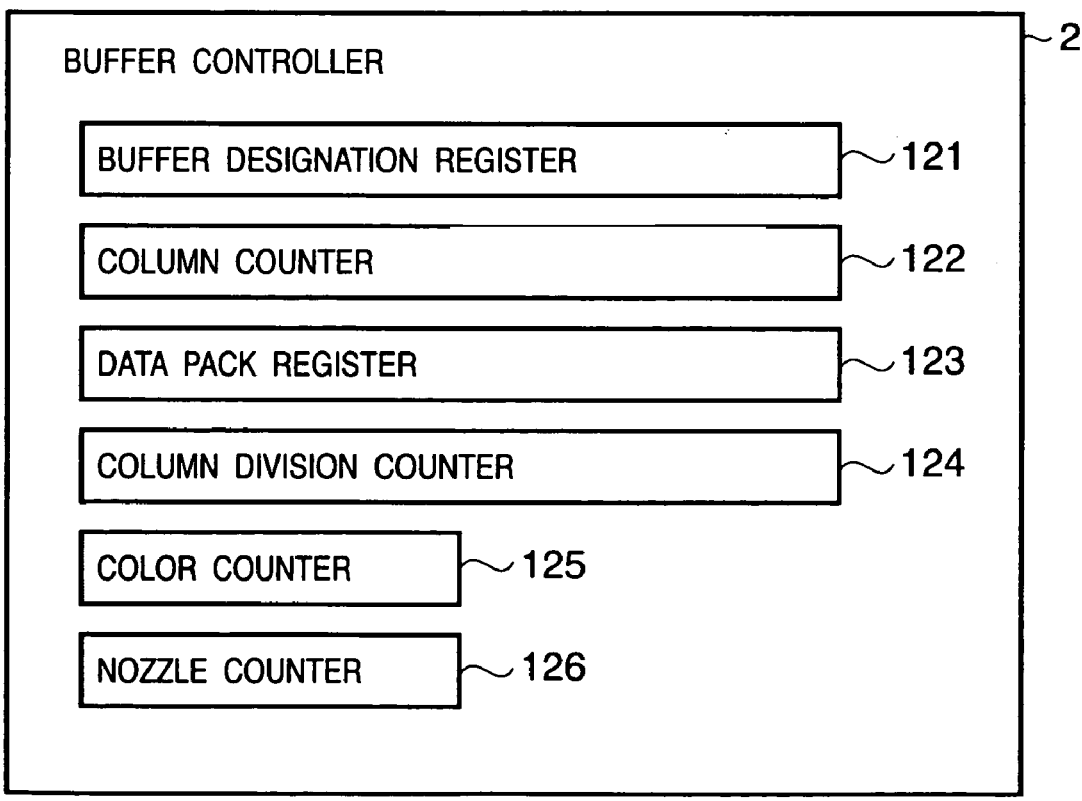
FIG. 12 is a block diagram showing the arrangement of a buffer controller according to the embodiment of the present invention.

As shown in FIG. 12, the buffer controller 2 comprises a buffer designation register 121 which refers to the states of buffers 7-1 and 7-2 in storage/read in/from the buffer memory 7.

The buffer controller 2 also comprises a column counter 122, data pack register 123, and column division counter 124 which are used for reading from the buffer memory 7. The data pack register holds at once a plurality of bits of 1-bit data read out from the buffer memory 7. The buffer controller 2 further comprises a color counter 125 and nozzle counter 126 which are used for storage in the buffer memory 7.

The buffer controller 2 can parallel-execute storage processing and read processing for the buffer memory 7. For example, storage processing in the buffer memory 7-1 and read processing from the buffer memory 7-2 can be simultaneously executed.

As the outline of printing processing in the embodiment, the CPU 5 reads out a printing control program from the memory which stores a CPU control program (not shown). An operation signal is supplied from an electrical circuit (not shown) to the printing mechanism driving unit 9, and positional information or the like is received from the printing mechanism driving unit 9 which operates in accordance with the signal. Raster data stored in the printing data memory 6 is stored in the buffer memory 7 within the printing controller 1. In reading from the buffer memory 7, the raster data is converted into a column format. The data is then transferred to the printhead 10 to print.

The transfer method to the printhead 10 is serial transfer in this case, but may be parallel transfer. In serial transfer, data are transferred via one data line. The serially transferred data are converted into parallel data by a logic circuit which is incorporated in the printhead and includes a shift register and latch. The parallel data are supplied to the driving circuits of printing elements. In parallel transfer, data are transferred via, e.g., 16 data lines.

Figure 3:
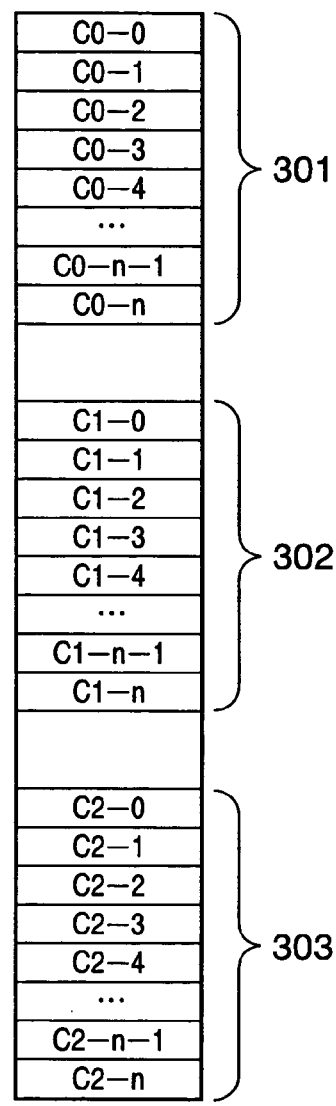
FIG. 3 is a view for explaining an arrangement example of a printhead.
Figure 4:
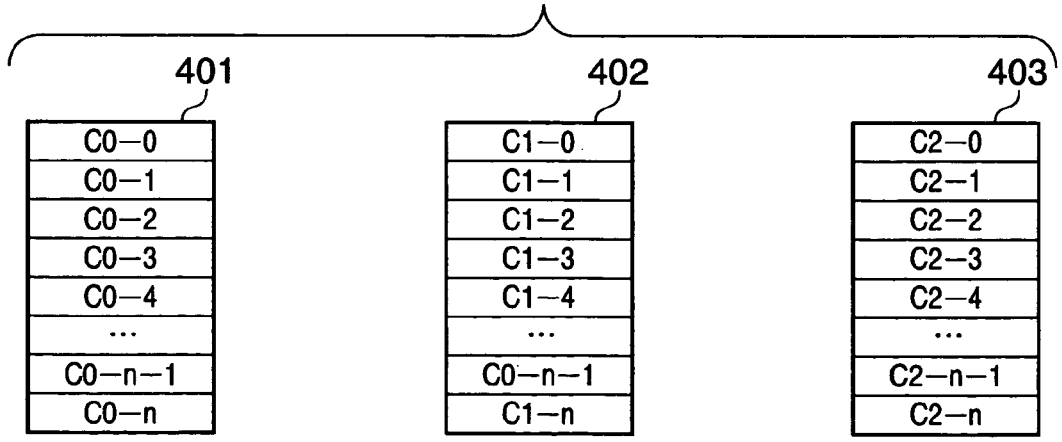
FIG. 4 is a view for explaining another arrangement example of the printhead.

FIGS. 3 and 4 are views showing the typical nozzle arrangement of the printhead mounted in the printer according to the embodiment. FIGS. 3 and 4 exemplify the use of three types of inks. However, the number of ink types for use may be three or more.

FIG. 3 illustrates an arrangement in which three printheads 301 to 303 each having a plurality of nozzles (0 to n) for each ink are aligned. The printhead prints by moving (scanning) it in a direction perpendicular to the direction in which the nozzles of the three printheads are aligned. After the end of each scanning, the printing medium is repetitively conveyed in almost the same direction as the nozzle array direction, thereby printing on one printing medium.

In the use of the three types of inks, like this example, the printing medium is conveyed by a distance corresponding to the length of one printhead (length of the nozzle array) after the end of each scanning. The three types of inks can be selectively discharged to the same position (pixel) to print by the three types of inks.

More specifically, assume that the printhead 301 discharges cyan ink, the printhead 302 discharges magenta ink, and the printhead 303 discharges yellow ink. A pixel printed by a nozzle C0-0 in the first scanning undergoes printing by a nozzle C1-0 in the second scanning and a nozzle C2-0 in the third scanning. This can realize color mixing printing using inks of three colors.

FIG. 4 also illustrates an arrangement in which three nozzle arrays 401 to 403 each having a plurality of nozzles (0 to n) for each ink are parallel-arranged. Also in this case, the scanning direction and printing medium convey direction are the same as those in FIG. 3. After the end of each scanning, the printing medium is repetitively conveyed in almost the same direction as the nozzle array direction by a distance corresponding to the length of one nozzle array, thereby printing on one printing medium.

From the comparison between the arrangements in FIGS. 3 and 4, they are different in that the three nozzle arrays are so serially arranged in a line in the arrangement of FIG. 3, but are parallel-arranged at the same horizontal position in the arrangement of FIG. 4.

In the arrangement shown in FIG. 4, three types of inks can be selectively discharged to the same pixel by one scanning. That is, color printing can be achieved by one pass, but the arrangement of FIG. 4 requires control of driving the three nozzle arrays at different timings.

As the printhead arrangement, various arrangements are known in addition to those shown in FIGS. 3 and 4. The arrangement is determined in consideration of various factors such as the apparatus cost and size, the target printing speed, and the size of the target printing medium.

As described above, a conventional printer adopts a buffer memory for each printhead, and a different printhead arrangement requires a different buffer memory arrangement. In the embodiment, the buffer memory is assigned to each nozzle to enable using buffer memories with the same arrangement regardless of the printhead arrangement.

The buffer memory is accessed by the buffer controller 2 shown in FIG. 2.

Figure 13:
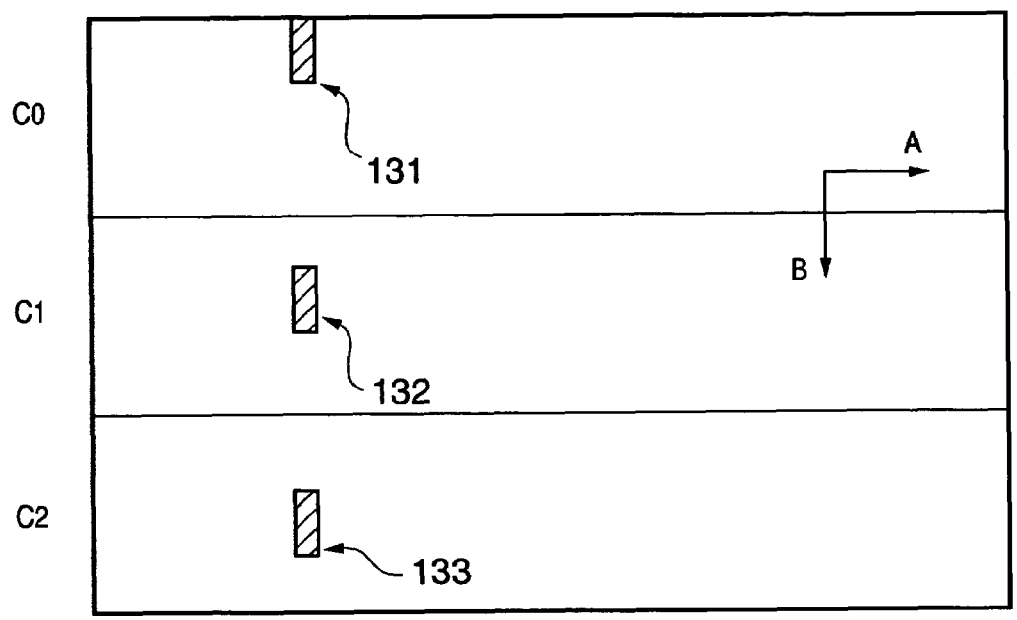
FIG. 13 is a view showing the principle of read from a printing data memory when nozzle arrays are serially arranged according to the embodiment of the present invention.
Figure 14:
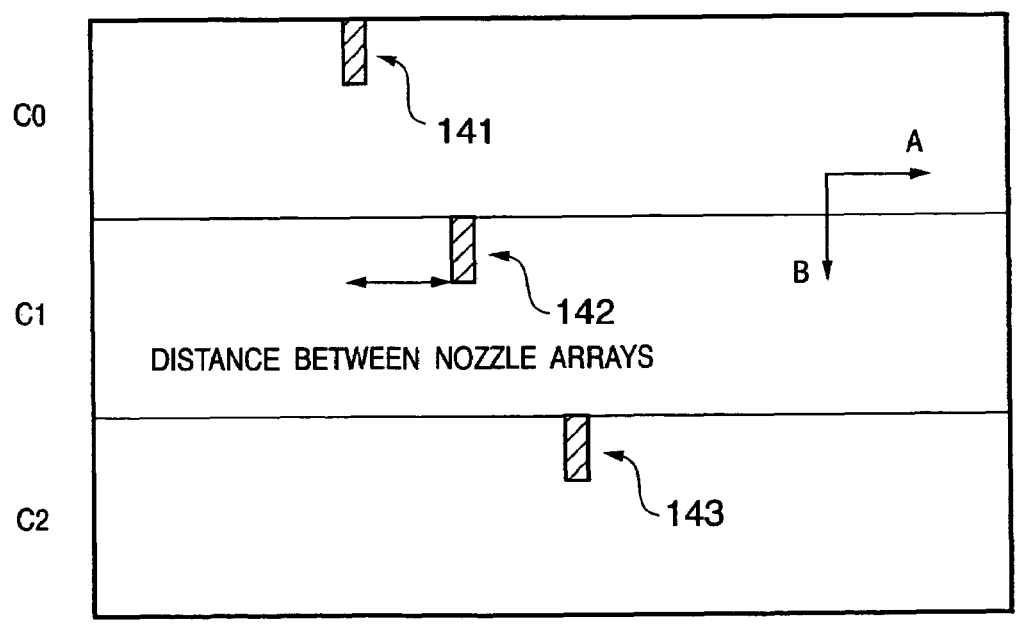
FIG. 14 is a view showing the principle of read from the printing data memory when nozzle arrays are parallel-arranged according to the embodiment of the present invention.

This will be explained with reference to FIGS. 13 and 14. FIGS. 13 and 14 show a state in which the printing data memory 6 stores the same data. The printing data memory 6 stores printing data C0, C1, and C2 for respective colors. This storage state corresponds to the printing direction of the printing medium. An arrow A indicates the main scanning direction, and an arrow B indicates the nozzle array direction (convey direction).

Of stored data, data to be read out are data 131, 132, and 133 in FIG. 13 or data 141, 142, and 143 in FIG. 14. Area sizes for these data correspond to 16 bits in the direction indicated by the arrow A and the number of nozzles in the direction indicated by the arrow B.

FIG. 13 is an explanatory view when nozzle arrays are serially arranged, as shown in FIG. 3. In this case, as shown in FIG. 13, the data 131, 132, and 133 are read out from their areas, and stored in one of the buffer memories 7-1 and 7-2. In the nozzle array direction, data are read out from addresses in correspondence with the distance between nozzle arrays. These read out addresses have the same offset amount with respect to the main scanning direction.

FIG. 14 is an explanatory view when nozzle arrays are parallel-arranged, as shown in FIG. 4. In this case, as shown in FIG. 14, the data 141, 142, and 143 are read out from their areas, and stored in one of the buffer memories 7-1 and 7-2. In the main scanning direction, data are read out from addresses in correspondence with the distance. These read out addresses have the same offset amount with respect to the nozzle array direction.

In this manner, printing data are read out from the printing data memory 6 in correspondence with the nozzle array arrangement, and stored at addresses in the buffer memories 7-1 and 7-2.

In the embodiment, like the arrangement example of the buffer memory 7 shown in FIG. 1, buffer memories corresponding to all nozzles as buffer memories for storing printing data are combined into one buffer memory 7. Data write/read for each nozzle is controlled in accordance with information (the number of colors for printheads, the number of nozzles of each printhead, the divisional driving number, the distance between nozzle arrays, and the like) stored in the register of the head parameter unit 4, regardless of whether printheads are serially arranged (FIG. 3) or parallel-arranged (FIG. 4). This arrangement can generate data for a nozzle by the same logical circuit regardless of the head arrangement shown in FIG. 3 or 4.

In the block diagram of FIG. 2, the buffer memory 7 is divided into two buffer memories 7-1 and 7-2 in order to execute data transfer to the printhead at higher speed by transferring data to the buffer controller 2 from one buffer memory and receiving data from the printing data memory 6 by the other one when printing data saved in the buffer memory 7 is to be transferred to the printing data converter 3 via the buffer controller 2. As will be described later, the buffer memories 7-1 and 7-2 alternately transfer and receive data. Data of 16 columns are alternately transferred to the printing data converter, and all column data for one main scanning are transferred.

In transferring data from the buffer memories 7-1 and 7-2 (reading out data from the buffer memories), raster data is converted into column data. Conversion processing will be described later.

Data transfer operation to the printhead according to the embodiment will be explained.

The head parameter unit 4 stores information on the printhead arrangement. FIG. 9 shows an example of information stored in the register incorporated in the head parameter unit 4. More specifically, the register stores the number (c_num) of nozzle arrays, the number (n_num) of nozzles which form each nozzle array, information (n1_diff) representing a position where printing data of the next nozzle is stored in the printing data memory 6, pieces of information (c0_diff, c1-diff, and c2_diff) representing addresses at which printing data of the next nozzle array are stored in the printing data memory 6, and information (bm_strt_adr) representing a position where the first data of printing data is stored. Note that c_num may represent the number of colors for printheads.

Data management in the buffer 7 using the number c_num of nozzle arrays and the number n_num of nozzles of each nozzle array will be explained using an example of the buffer arrangement in FIG. 1. The number of colors for printheads adopted in the example of FIG. 1 is three, i.e., C0, C1, and C2, and one nozzle array corresponds to one color. Hence, c-num is three. Assume that the numbers n_num of nozzles of the three nozzle arrays C0, C1, and C2 are n, m, and l, and the number of printing data storage elements (arrays) of the buffer memory 7 is N (n+m+l<N). The address of the buffer memory 7 designates an array, and takes a value of 0 to N−1. The numbers n, m, and l of nozzles may be equal or different. Also, the number of colors is not limited to three.

When data are stored in the buffer memory 7 in the order of C0, C1, and C2, printing data corresponding to n nozzles 0 to n−1 of the nozzle array C0 are stored at addresses 0 to n−1 in the buffer memory 7. Printing data corresponding to m nozzles 0 to m−1 of the nozzle array C1 are stored at addresses n to n+m−1 in the buffer memory 7. Printing data corresponding to l nozzles 0 to l−1 of the nozzle array C2 are stored at addresses n+m to n+m+l−1 in the buffer memory 7. Addresses n+m+l to N−1 in the buffer memory 7 are not used in this example.

Read processing from the buffer memory 7 will be described with reference to FIG. 10.

Read from the buffer 7-1 will be-explained. Read from the buffer 7-2 is the same as that from the buffer 7-1, and a description thereof will be omitted.

Data is read out from the buffer memory by using the column counter 122 and column division counter 124 shown in FIG. 12. Either counter has an initial value of 0.

Data of 16 bits is stored at one address. Data in the first column is read out. Since the number of simultaneously driven bits is three, data are read out bit by bit from addresses 0, 8, and 16. In this case, address 0 is accessed to read out bit data 01. Address 8 is then accessed to read out bit data 81, and address 16 is accessed to read out bit data 161. In this manner, data read out bit by bit form 16-bit data to convert raster data into column data. Upon the completion of read from addresses 0, 8, and 16, the column division counter 124 is counted up to 1.

Data read bit by bit are temporarily held in the data pack register 123 in FIG. 12. After data of three bits to be simultaneously driven are stored, the data are transferred to the printing data converter 3.

Data are read out bit by bit from addresses 1, 9, and 17, and stored in the data pack register 123. The data stored in the data pack register 123 are transferred to the printing data converter 3. At this time, the column division counter 124 is counted up to 2.

Data read is sequentially executed, and after data at addresses 7, 15, and 23 are transferred to the printing data converter 3, the column division counter 124 is counted up to 8. Since the value of the column division counter 124 is 8, the buffer controller 2 determines that data of the first column have been transferred. The column counter 122 is counted up to set 1, and the value of the column division counter 124 is cleared to 0.

As for data in the second and subsequent columns, the read address is changed to similarly access the buffer. For example, in read from the second column, addresses 0, 8, and 16 are sequentially accessed to read out bit data 02, 82, and 162. The readout data are temporarily held in the data pack register 123. Similar to the first column, data are read out up to data at addresses 7, 15, and 23. The column counter 122 is counted up to set 2, and the value of the column division counter 124 is cleared to 0. This operation is subsequently repeated up to the 16th column, data are read out from the buffer memory, and the column counter 122 is counted up. If the value of the column counter 122 reaches 16, the buffer controller 2 determines that read from the buffer 7-1 has been completed. In this way, read control is done on the basis of the values of the column counter 122 and column division counter 124.

Read processing is performed in correspondence with the printhead driving method. One of printhead driving methods is distributed driving of driving a predetermined number of nozzles. For example, when nozzles are simultaneously driven every nine nozzles in a printhead having 24 nozzles, the first, ninth, and 17th nozzles of the printhead are simultaneously driven. In this case, data corresponding to three nozzles described above are transferred to the printhead.

The embodiment employs distributed driving of driving every nine nozzles, as described above, and the buffer is accessed every nine addresses. In driving every five nozzles, the buffer is accessed every five addresses. By accessing each address, the printing apparatus can cope with any distributed driving value. The buffer controller 2 can accurately transfer printing data to the printhead by referring to information on the distributed driving number that is stored in the head parameter unit 4.

In the embodiment, data are read out bit by bit and stored in the data pack register 123. Alternatively, data may be read out and stored every plurality of bits in accordance with the format of data stored in the printing data memory.

The data size (data width or the number of bits) serving as the printing data storage unit of the buffer memory 7 is determined by the system configuration condition. This condition is determined in consideration of the time taken to read out the next printing data from one buffer while using the other buffer for generation of printing data when the printing controller 1 alternately switches and uses two buffer memories, as described above, or the data width (8 bits, 16 bits, 32 bits, or the like) used in the system.

Figure 5:
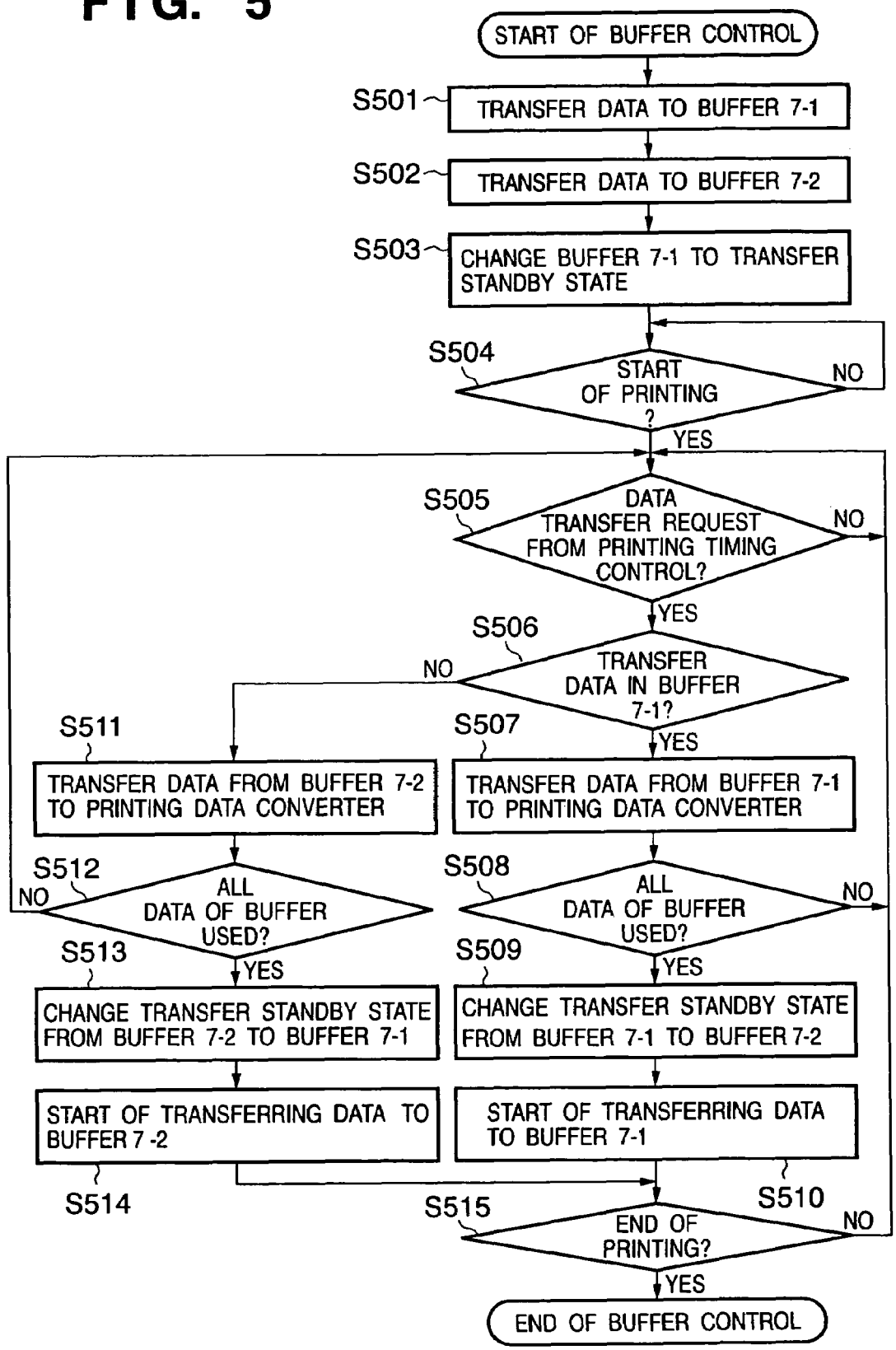
FIG. 5 is a flow chart showing buffer processing for printing data according to the embodiment.

The flow of buffer control processing in the above arrangement will be described with reference to the flow chart of FIG. 5 and the timing charts of FIGS. 6A to 6I.

Write in the buffer memory 7 by the buffer controller 2 starts in accordance with an instruction from the CPU 5. Prior to the start of printing, the CPU 5 stores printing data necessary for printing in the printing data memory 6. In write in the buffer memory 7, the buffer controller 2 reads out necessary data from the printing data memory 6. The memory controller 12 performs two operations: an operation corresponding to access from the CPU 5, and an operation of transferring printing data to the buffer controller 2 on the basis of a request from the buffer controller 2.

Figure 6:
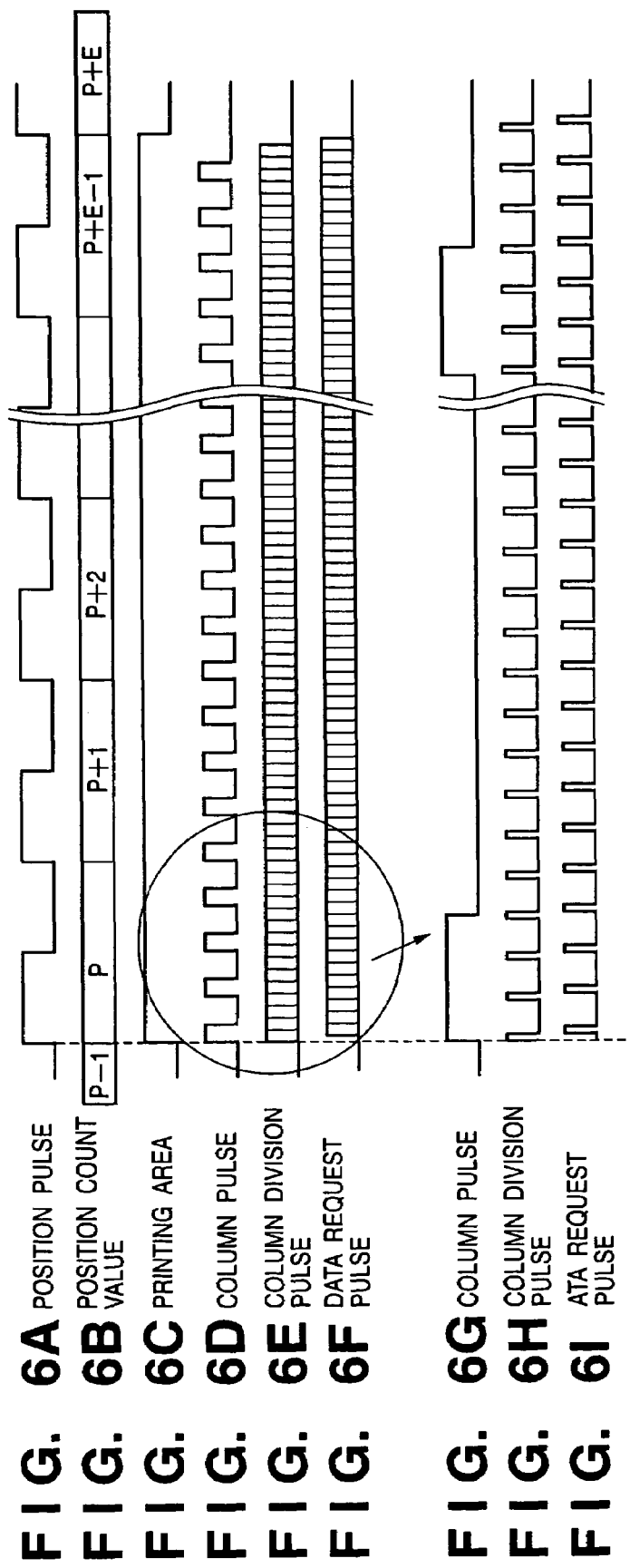
FIGS. 6A to 6I are timing charts showing changes in signals according to the embodiment.

Signals shown in the timing charts of FIGS. 6A to 6I will be explained. A position pulse (FIG. 6A) is a signal generated by the encoder of the printing mechanism driving unit 9 or the like, and a position count (FIG. 6B) is generated on the basis of this signal. A column pulse (FIG. 6D) is generated from the position pulse (FIG. 6A) by the printing timing controller 8 in correspondence with a column subjected to printing. The column pulse is divided into a plurality of pulses to generate column division pulses (FIG. 6E) used to drive the printhead. A data request pulse (FIG. 6F) to the buffer controller 2 is generated from the column division pulse. FIGS. 6G, 6H, and 6I show the signals in FIGS. 6D, 6E, and 6F which are enlarged along the time axis.

The buffer controller 2 starts storage processing for the buffer 7 in response to a start instruction from the CPU 5. A printing data memory address rd_adr is set in an initial value bm_strt_adr. Printing data read out from rd_adr in the printing data memory 6 is stored at address 0 in the buffer memory 7-1 on the basis of the buffer arrangement of FIG. 1. Printing data read out from bm_strt_adr+n1_diff is stored at address 1 in the buffer memory 7-1, and printing data from bm_strt_adr+n1_diffx(n−1) is stored at address n−1. Letting k be the address of the buffer memory, rd_adr and the buffer memory address have a relationship:

$$c0: rd\_adr=bm\_strt\_adr+n1\_diff\times(k-1)$$

$$c1: rd\_adr=bm\_strt\_adr+n1\_diff\times(k-2)+c0\_diff$$

$$c2: rd\_adr=bm\_strt\_adr+n1\_diff\times(k-3)+c0\_diff+c1\_diff$$

Based on this relationship, printing data are sequentially stored in the buffer memory 7-1. "rd adr" is not always calculated by the above relation, but address calculation processing by hardware is done for the previous result to acquire address information of the printing data memory 6. Read processing from the printing data memory and storage processing in either of the buffers 7-1 and 7-2 are executed. These series of processes (first processing: address calculation processing, second processing: read processing from the printing data memory on the basis of the address calculation result, and third processing: storage processing of readout data in the buffer) are repeated to store data of each address of the printing data memory 6 in the buffer memory 7 (step S501).

In this case, the processing is executed while referring to the values of the color counter 125 and nozzle counter 126 in FIG. 12. If a predetermined value is obtained on the basis of information in the head parameter unit 4, the flow advances to the next processing.

For example, data C0 are read out from the printing data memory, and sequentially-stored in the buffer memory 7-1. Every time one data is stored, the nozzle counter 126 is counted up, and whether a predetermined number of data have been stored is determined by a comparator on the basis of the value C0_n_num. If the comparator detects that all n data C0 have been stored, the color counter 125 is counted up to set 1. The nozzle counter 126 is then cleared to 0.

Similarly, data C1 are read out from the printing data memory, and sequentially stored in the buffer memory 7-1. If the comparator detects on the basis of the value C1_n_num that all m data C1 have been stored, the color counter is counted up to set 2. The nozzle counter 126 is then cleared to 0.

Similarly, after data C2 are stored, the color counter is counted up to set 3. Based on the value c_num, data of 16 columns are determined to have been stored for all color data. Data of the next 16 columns are stored in the buffer memory 7-2.

After the end of storing data in the buffer memory 7-1, subsequent printing data are read out from the printing data memory 6 and stored in the buffer memory 7-2 by using the sum of the previous address rd_adr and c1_diff as address 0 of the buffer memory 7-2. This processing is repeated to store printing data (step S502).

If the start of printing operation is detected (step S504) after the buffer memory changes to a transfer standby state (step S503), a request for data transfer to the printing data converter 3 that is issued from the printing timing controller 8 to the buffer controller 2 is detected from reception of a data request pulse shown in FIGS. 6F and 6I that is generated in accordance with position information (e.g., the position pulse shown in FIG. 6A and the position count in FIG. 6B) transferred from the printing mechanism driving unit 9 to the printing timing controller 8 (step S505). Data transfer from the buffer memory 7-1 by the buffer controller 2 is then executed.

In FIGS. 6A to 6I, four column pulses are output at a position count P. For example, the column pulse shown in FIG. 6D is output four times, and all data of 16 columns are read out from the buffer 7-1. When the next four column pulses are to be output, data are read out from the buffer 7-2.

Data output at the column division pulse in FIG. 6E is data held in the data pack register 123 described with reference to in FIG. 10.

Figure 10:
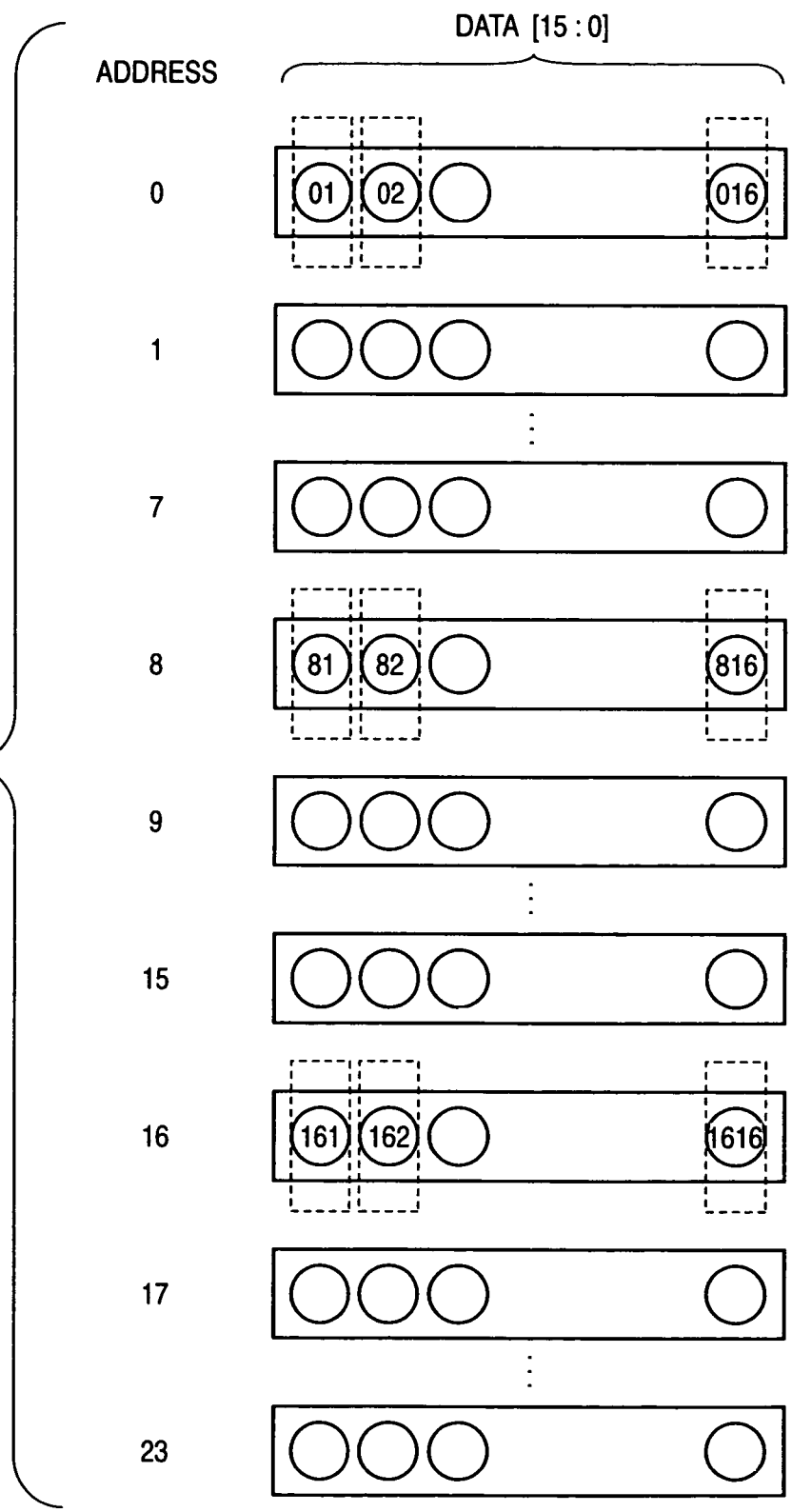
FIG. 10 is an explanatory view showing read processing from a buffer memory.
Figure 11:
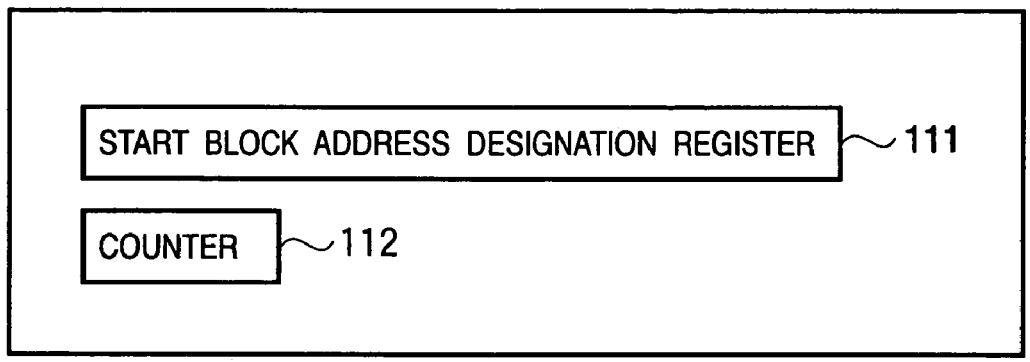
FIG. 11 is a block diagram showing access control to a conventional print buffer.

The number of column division pulses corresponding to one column pulse is 16, but 8 in the case of FIG. 10.

The buffer controller 2 supplies a signal representing that data transmitted from the buffer controller 2 to the printing data converter 3 is valid. The printing data converter 3 supplies printing data to the printhead.

If data transfer from the buffer memory 7-1 to the buffer controller 2 is determined (step S506), data is transferred for each storage unit of the buffer memory in correspondence with the data request pulse in FIGS. 6F and 6I (step S507). Every time the data request pulse is received, data transfer of the storage unit is repeated. After data request pulses corresponding to the number of data stored in the buffer memory 7-1 are output, all data in the buffer memory 7-1 are determined to have been used (step S508). At this time, the transfer standby state shifts from the buffer memory 7-1 to the buffer memory 7-2 (step S509), and transfer of printing data stored in the printing data memory to the buffer memory 7-1 starts (step S510).

Whether printing has ended is determined from the signals in FIGS. 6A to 6C (step S515). If NO in step S515, the flow returns to step S505 in order to transfer data from the buffer 7-2 to the printing data converter 3 in response to a data request for the next four column pulses.

At this time, the flow advances from step S506 to step S511 because of data transfer from the buffer memory 7-2. Similar to the above processing, every time the data request pulse is received, data transfer of each array is repeated. After data request pulses corresponding to the number of data stored in the buffer memory 7-2 are output, all data in the buffer memory 7-2 are determined to have been used (step S512). At this time, the transfer standby state shifts from the buffer memory 7-2 to the buffer memory 7-1 (step S513), and transfer of printing data stored in the printing data memory to the buffer memory 7-2 starts (step S514).

If the end of printing is determined in step S515, buffer control processing ends. Note that storage processing in the buffers 7-1 and 7-2 is not limited to processes in steps S501 and S502. Alternatively, data may be stored in the buffer memory 7-1 before the start of printing and stored in the buffer memory 7-2 after the start of printing as far as data storage catches up with printing operation.

Concrete Example of VHDL

The arrangement according to the embodiment will be described for a description example using a hardware description language. FIGS. 8A to 8K show a description example when VHDL is adopted as a hardware description language in the arrangements of the buffer controller 2 and a printing data memory read controller 11 in the block diagram of FIG. 2. This description example is based on the flow chart of FIG. 5, and one processing covers a plurality of processes in the flow chart of FIG. 5. The contents of the description will be explained.

In FIG. 8A, a part which starts from "entry" and ends at "end" declares input/output of the entire block. Contents within GENERICO of this part form a description which declares variables allowing change of the data size used in this block to a size optimal for use in another system. In this example, these contents describe an application to a system in which the maximum value of an array in the lateral direction, i.e., the maximum number of printing positions by one scanning is 8,192 (0 to 8,191: X_MSB=13), the width of data from the buffer controller 2 to the printing data converter 3 has 6 bits (B_NUM=5), the address used to access the external printing data memory 6 has 22 bits, and the data width has 32 bits (A_LSB=2).

Contents within port( ) define input and output signals to and from the block. This example is applied to a system which performs printing four types of pieces of information. A signal uniquely used for each information is identified by determining which of C0_, C1_, C2_, and C3_ is added to the head of a signal name. Further, this example is applied to a system which divides the nozzles of the printhead into 16 blocks and drives them in time division.

Parts in FIGS. 8B to 8K which start from ARCHITECTURE RTL OF and end at END RTL; are logical descriptions for executing the operation of the embodiment. The part in FIG. 8B defines constants (CONSTANT) and signals (SIGNAL) used in the logical description. The parts in FIGS. 8C to 8K describe actual logics.

Contents in FIGS. 8C to 8K will be explained in more detail.

The block in this example starts initialization by setting an "init" input to "1", and executes activation after initialization when the "init" input changes to "0". After the start of activation, an initialization pulse and a read activation pulse for a request from the printing timing controller 8 are generated in accordance with the description of a part 801 (part of step S501).

Parts after the part 801 in FIG. 8C to FIG. 8F are descriptions for controlling data read from the buffer memory in accordance with the printhead arrangement (S504, S505, S507, part of S511, and S515).

A part shown in FIG. 8G is a description for detecting the use states of buffers in order to alternately use two memory buffers (steps S506, S508, S509, S512, and S513).

A part shown in FIG. 8H is a description for converting data read out from the buffer memory by the printing data converter 3 in accordance with the printhead arrangement and generating data with a requested arrangement (step S507 and part of step S511).

A part shown in FIG. 8I is a description for writing data in the buffer memory in accordance with the state detected in accordance with the description shown in FIG. 8G in order to alternately use the two memory buffers (steps S510 and S514).

A part shown in FIG. 8J is a description for, when a write request to the memory buffer is generated by the part shown in FIG. 8I, requesting data of the external printing data memory 6, detecting a response to the request, and notifying the block in FIG. 8I that valid data has been supplied from the printing data memory 6 (part of step S501, and processing associated with the data save portion in S514 and S510).

A part shown in FIG. 8K is a description for, when data is requested of the printing data memory 6 in accordance with the part shown in FIG. 8J, calculating a location (address) where necessary data exists in the printing data memory 6 in accordance with the progress of printing, and generating the calculated address at a requested timing (this description executes part of step S501, and steps S502, S503, S514, and S510).

Other Embodiment

In the above description, the present invention is applied to an ink-jet printer. However, the present invention can also be applied to a printing apparatus which employs a method other than the ink-jet method as far as the present invention is of a serial type.

The present invention can be applied to a system comprising a plurality of devices (e.g., host computer, interface, reader, printer) or to an apparatus comprising a single device (e.g., copying machine, facsimile machine).

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

If the present invention is realized as a storage medium, program codes corresponding to the above mentioned flowcharts and/or descriptions of the hardware description language (FIG. 5 and/or FIGS. 8A to 8K) are to be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which performs printing by scanning a carriage, which supports a printhead having a plurality of printing elements arrayed in a predetermined direction, relative to a printing medium in a direction perpendicular to the predetermined direction, comprising:

a printing data memory which stores printing data of a raster format;

a buffer memory which has a storage area corresponding to each printing element and stores printing data stored in said printing data memory;

a head parameter unit, for driving a selected printhead of various types of printheads, which stores information on a number of concurrently drivable printing elements according to distributed driving for each of the various types of printheads, an interval of adjacent printing elements of the concurrently drivable printing elements of each of the various types of the printheads, and a number of a plurality of printing elements of each of the various types of the printheads;

a counter which counts a number of reading operations for reading out the printing data from said buffer memory;

a buffer controller which controls, in accordance with the information stored in said head parameter unit, processing of reading out the printing data stored in said printing data memory and storing the printing data in said buffer memory, and processing of reading out the printing data stored in said buffer memory; and driving control means for controlling the distributed driving of the plurality of printing elements in the printhead according to the information stored in said head parameter unit, wherein said buffer controller calculates a read address in accordance with the number of concurrently drivable printing elements in the distributed driving of the selected printhead, the interval of adjacent printing elements of the concurrently drivable printing elements of the selected printhead, the number of the plurality of printing elements of the selected printhead in reading out the printing data stored in said buffer memory, and the number of reading operations counted by said counter.

2. The apparatus according to claim 1, wherein the information stored in said head parameter unit includes at least the number of nozzle arrays of the printhead, the number of nozzles which constitute the nozzle arrays, and nozzles to be driven in the nozzle arrays.

3. The apparatus according to claim 1, wherein said buffer controller converts the raster data into column data in reading out the printing data stored in said buffer memory.

4. The apparatus according to claim 1, wherein said buffer controller reads out the printing data stored in said buffer memory from each address.

5. The apparatus according to claim 4, wherein said buffer controller includes a register which holds, by a plurality of addresses, data of predetermined bits read out by accessing each address of said buffer memory.

6. The apparatus according to claim 1, further comprising transfer means for transferring the data read out from said buffer memory to the printhead.

7. A printing data control method in a printing apparatus which performs printing by scanning a carriage, which supports a printhead having a plurality of printing elements arrayed in a predetermined direction, relative to a printing medium in a direction perpendicular to the predetermined direction, comprising:

a printing data storage step of storing printing data of a raster format in a printing data memory;

a buffer step of storing printing data stored in the printing data memory in a buffer memory having a storage area corresponding to each printing element;

a parameter storage step, for driving a selected printhead of various types of printheads, of storing information on a number of concurrently drivable printing elements according to distributed driving for each of the various types of printheads, an interval of adjacent printing elements of the concurrently drivable printing elements of each of the various types of printheads, and a number of a plurality of printing elements of each of the various types of printheads in a head parameter unit;

a counting step of counting a number of reading operations for reading out the printing data from the buffer memory;

a buffer control step of controlling, in accordance with the information stored in the head parameter unit, processing of reading out the printing data stored in the printing data memory and storing the printing data in the buffer memory, and processing of reading out the printing data stored in the buffer memory; and a driving control step of controlling the distributed driving of the plurality of printing elements in the printhead according to the information stored in the head parameter unit, wherein upon reading out the printing data stored in the buffer memory, a read address is calculated at said buffer control step in accordance with the number of concurrently drivable printing elements in the distributed driving of the selected printhead, the interval of adjacent printing elements of the concurrently drivable printing elements of the selected printhead, the number of the plurality of printing elements of the selected printhead, and the number of reading operations counted at said counting step.

* * * * *